(12) United States Patent
Yoshizawa et al.

(10) Patent No.: US 11,375,115 B2
(45) Date of Patent: Jun. 28, 2022

(54) IMAGE CAPTURING APPARATUS, CONTROL METHOD THEREOF, AND RECORDING MEDIUM THEREOF

(71) Applicant: CANON KABUSHIKI KAISHA, Tokyo (JP)

(72) Inventors: Akitaka Yoshizawa, Yokohama (JP); Yoshihiro Kobayashi, Kawasaki (JP); Tomokazu Mori, Fujisawa (JP); Hitoshi Nishitani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 389 days.

(21) Appl. No.: 16/706,560

(22) Filed: Dec. 6, 2019

(65) Prior Publication Data

US 2020/0195848 A1 Jun. 18, 2020

(30) Foreign Application Priority Data

Dec. 14, 2018 (JP) .............................. JP2018-234104

(51) Int. Cl.
*H04N 5/232* (2006.01)
*H04N 1/00* (2006.01)

(52) U.S. Cl.
CPC ..... *H04N 5/23245* (2013.01); *H04N 1/00488* (2013.01); *H04N 1/00501* (2013.01); *H04N 5/23216* (2013.01); *H04N 5/232941* (2018.08)

(58) Field of Classification Search
CPC .......... H04N 1/00488; H04N 1/00501; H04N 5/23216; H04N 5/23245; H04N 5/232933; H04N 5/232941
See application file for complete search history.

(56) References Cited

U.S. PATENT DOCUMENTS

2016/0227091 A1* 8/2016 Miura .................. H04N 5/2352
2021/0072950 A1* 3/2021 Kasugai ................ G03B 17/00

FOREIGN PATENT DOCUMENTS

JP        2007-124361 A      5/2007

* cited by examiner

*Primary Examiner* — Daniel M Pasiewicz
(74) *Attorney, Agent, or Firm* — Canon U.S.A., Inc. IP Division

(57) ABSTRACT

An image capturing apparatus with a mechanical shutter, an output unit that outputs a sound, and a setting unit that sets whether the output unit outputs sound includes an image capturing mode where image capturing occurs without the mechanical shutter and an image capturing mode where image capturing is automatically switched between using the mechanical shutter and not using the mechanical shutter, where during image capturing without the mechanical shutter the output unit outputs sound based on the setting made by the setting unit, and where during image capturing without the mechanical shutter when image capturing switches between using and not using the mechanical shutter, the output unit outputs sound regardless of the setting made by the setting unit.

14 Claims, 7 Drawing Sheets

FIG.3A

| | | |
|---|---|---|
| | SETTING MENU | |
| 300 — | SHUTTER MODE | ELECTRONIC |
| 310 — | SHUTTER SOUND | OFF |
| | | |

FIG.3B

| | | | |
|---|---|---|---|
| | SETTING MENU | | |
| 300 — | SHUTTER MODE | MECHANICAL | — 301 |
| | | ELECTRONIC | — 302 |
| | | AUTO | — 303 |

FIG.3C

| | | | |
|---|---|---|---|
| | SETTING MENU | | |
| | | | |
| 310 — | SHUTTER SOUND | ON | — 311 |
| | | OFF | — 312 |

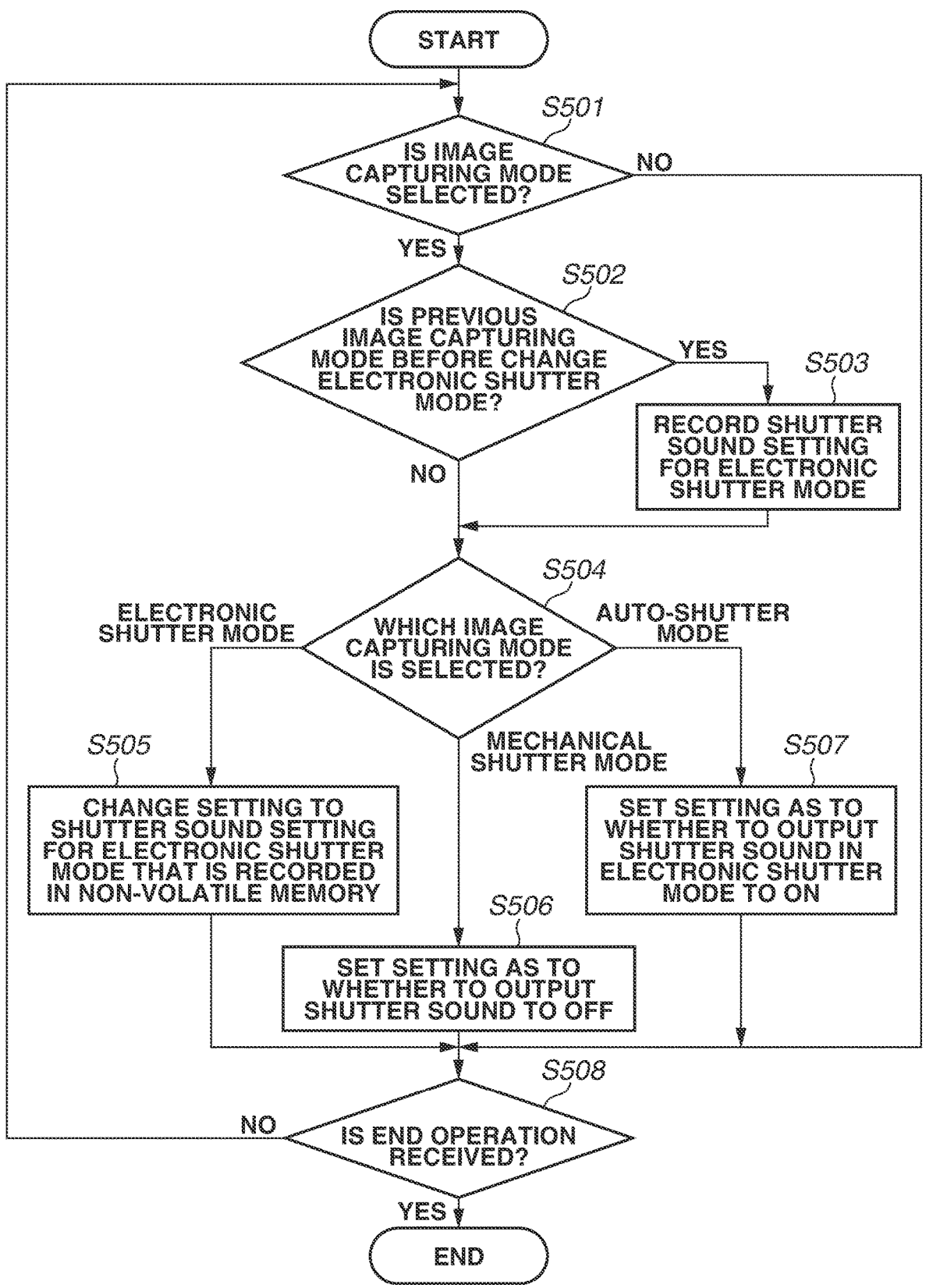

IMAGE CAPTURING APPARATUS, CONTROL METHOD THEREOF, AND RECORDING MEDIUM THEREOF

BACKGROUND

Field

The present disclosure relates to an image capturing apparatus including a mechanical shutter.

Description of the Related Art

In recent years, image capturing by a digital camera has included two image capturing modes: image capturing using a mechanical shutter (image capturing in a mechanical shutter mode) and image capturing without a mechanical shutter (image capturing in an electronic shutter mode). Some digital cameras automatically switch between the mechanical shutter mode and the electronic shutter mode based on a setting, such as a shutter speed, and the state of a subject, such as ambient brightness, to capture images.

In the image capturing in the mechanical shutter mode, opening/closing sounds of the mechanical shutter are generated so that a user can recognize that an image is captured by hearing the opening/closing sounds. In the image capturing in the electronic shutter mode, the mechanical shutter does not open or close, enabling the user to quietly capture an image. The digital camera can be set to output an electronic shutter sound to notify the user that an image is captured.

Japanese Patent Application Laid-Open No. 2007-124361 discusses an image capturing apparatus where the user can set whether to output an electronic shutter sound. In a case where a camera discussed in Japanese Patent Application Laid-Open No. 2007-124361 includes the function of automatically switching the mechanical shutter mode and the electronic shutter mode and capturing an image, the following can occur.

The user sets the digital camera not to output an electronic shutter sound, and the mechanical shutter mode and the electronic shutter mode are automatically switched and an image is captured. In this case, opening/closing sounds of the mechanical shutter are generated during the image capturing in the mechanical shutter mode, whereas no electronic shutter sound is output during the image capturing in the electronic shutter mode. The digital camera automatically selects one of the two image capturing methods without notifying the user of the selected image capturing method, so that there is a possibility that the user cannot recognize whether an image is captured based on a sound during image capturing with the digital camera.

SUMMARY

According to an aspect of the present disclosure, an image capturing apparatus includes an image capturing unit including a mechanical shutter, an output unit configured to output an electronic sound, a control unit configured to implement a first image capturing mode in which the image capturing unit is controlled to execute image capturing using the mechanical shutter, a second image capturing mode in which the image capturing unit is controlled to execute image capturing without the mechanical shutter, and a third image capturing mode in which the image capturing unit is controlled to automatically switch between image capturing using the mechanical shutter and image capturing without the mechanical shutter and then execute image capturing, and a setting unit configured to set whether to output the electronic sound from the output unit, wherein during the image capturing in the second image capturing mode, the control unit controls the output unit based on the setting made by the setting unit, and wherein during the image capturing without the mechanical shutter in the third image capturing mode, the control unit controls the output unit such that the electronic sound is output regardless of the setting made by the setting unit.

Further features of the present disclosure will become apparent from the following description of exemplary embodiments with reference to the attached drawings.

BRIEF DESCRIPTION OF THE DRAWINGS

FIG. 3A illustrates an example of a screen via which a user sets an image capturing mode and an electronic shutter sound output. FIG. 3B illustrates an example of a display screen in a case where the user selects an item of the image capturing mode.

FIG. 3C illustrates an example of a display screen in a case where the user selects an item of an electronic shutter sound.

FIG. 5 is a flowchart illustrating an example of a method of setting whether to output an electronic shutter sound of the digital camera according to the first exemplary embodiment.

DESCRIPTION OF THE EMBODIMENTS

An exemplary embodiment will be described below with reference to the drawings.

Figure 1A:
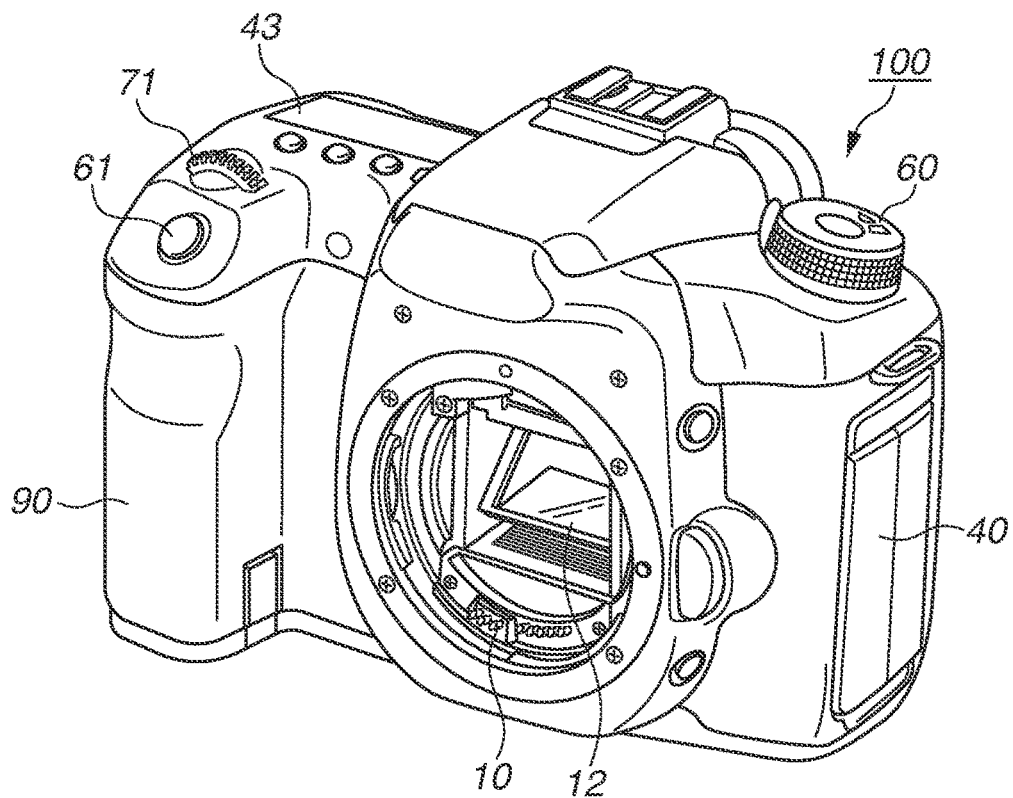
FIG. 1A illustrates an example of a perspective view of a front surface of a digital camera according to a first exemplary embodiment.
Figure 1B:
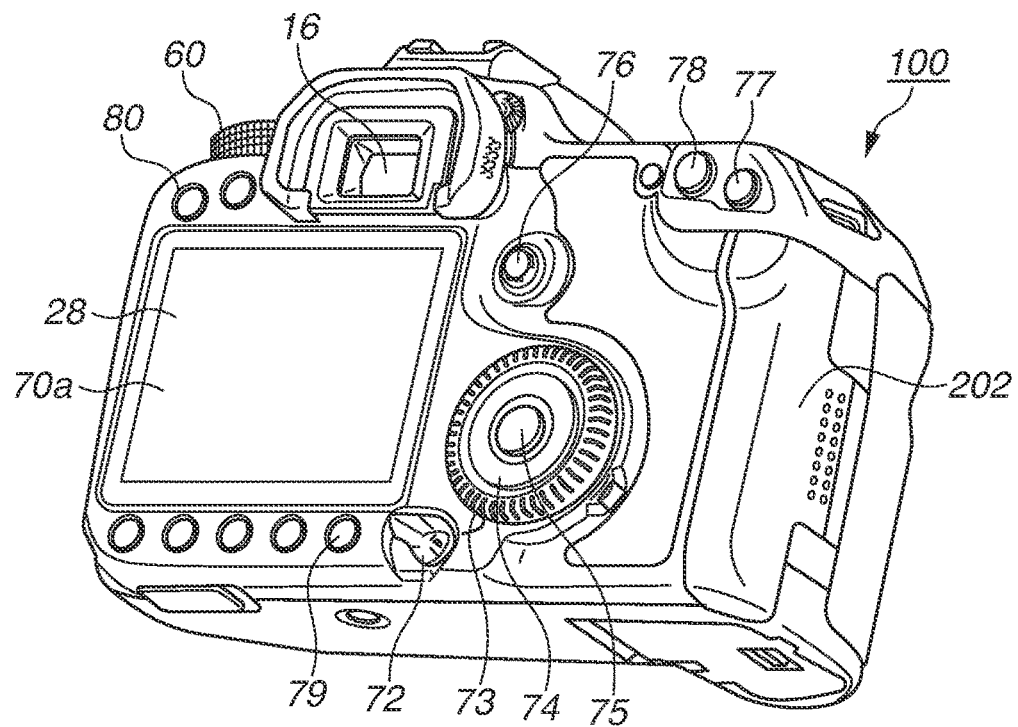
FIG. 1B illustrates an example of a perspective view of a rear surface of the digital camera according to the first exemplary embodiment.

A first exemplary embodiment is described below. FIGS. 1A and 1B illustrate an external view of a digital camera 100 (image capturing apparatus) as an example of an electronic device according to the present exemplary embodiment.

FIG. 1A is a perspective view illustrating a front surface of the digital camera 100, and FIG. 1B is a perspective view illustrating a rear surface of the digital camera 100. In FIGS. 1A and 1B, a display unit 28 is a display unit that displays an image and various types of information, and is located on the rear surface of the digital camera 100. A display portion 43 outside a viewfinder is a display unit located on an upper surface of the digital camera 100, and various setting values of the digital camera 100, such as a shutter speed and an aperture, are displayed on the display portion 43.

A shutter button 61 is an operation unit for inputting an image capturing instruction. A mode selection switch 60 is an operation unit for switching various modes. A terminal cover 40 is a cover that protects a connector (not illustrated) of a connection cable or the like that connects an external device and the digital camera 100. A main electronic dial 71 is a rotary operation member of an operation unit 70. The setting values such as the shutter speed and the aperture can be changed by rotating the main electronic dial 71. A power supply switch 72 is an operation member for turning on or off the power supply of the digital camera 100.

A sub-electronic dial 73 is a rotary operation member of the operation unit 70 and is used to move a selection frame and forward an image. A directional pad 74 is a directional pad (four-direction keys) of the operation unit 70. Upper, lower, left, and right portions of the directional pad 74 are each selectable. An operation corresponding to a selected portion of the directional pad 74 is executable. A "SET" button 75 is a selectable button of the operation unit 70 and is mainly used to determine a selected item.

A live-view (LV) button 76 is a button of the operation unit 70 and is used to turn on/off a live view (hereinafter, referred to as "LV") using a menu button. In a moving image capturing mode, the LV button 76 is used to input an instruction to start/stop moving image capturing (recording). An enlargement button 77 of the operation unit 70 is an operation button for turning an enlargement mode on or off during a live-view display in an image capturing mode and for changing an enlargement rate during the enlargement mode. In a reproduction mode, the enlargement button 77 functions as an enlarge button for enlarging a regenerated image and increasing the enlargement rate. A reduction button 78 of the operation unit 70 is a button for decreasing the enlargement rate of an enlarged regenerated image and reducing the size of a displayed image.

A reproduction button 79 of the operation unit 70 is an operation button for switching the image capturing mode and the reproduction mode. If the reproduction button 79 is pressed during the image capturing mode, the mode is changed to the reproduction mode, and the latest image from among the images recorded in a recording medium 200 is displayed on the display unit 28.

A quick-return mirror 12 is moved up/down by an actuator (not illustrated) based on an instruction from a system control unit 50. A communication terminal 10 is a communication terminal for communication with a lens (removable) by the digital camera 100. An eyepiece finder 16 is a viewfinder that the user looks into to check the focal point and composition of an optical subject image acquired through a lens unit 150 by observing a focusing screen 13. A cover 202 is a cover for a slot in which the recording medium 200 is stored. A grip portion 90 is a holding unit with a shape that is easy for the user to grip with the right hand of the user when the user holds the digital camera 100.

Figure 2:
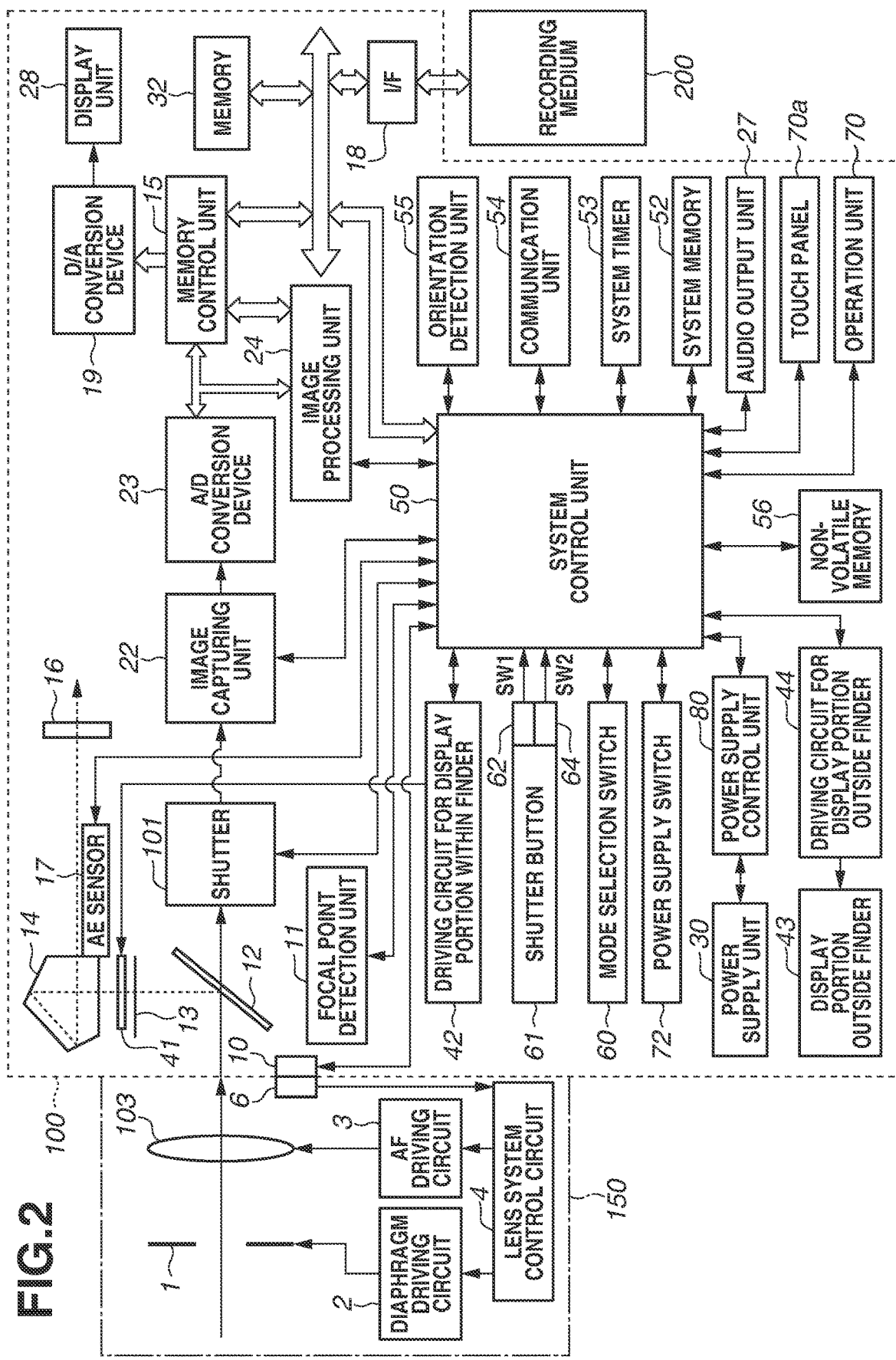
FIG. 2 is a block diagram illustrating an example of a configuration of the digital camera according to the first exemplary embodiment.

FIG. 2 is a block diagram illustrating an example of a configuration of the digital camera 100 according to the present exemplary embodiment. In FIG. 2, the lens unit 150 is a lens unit including a replaceable image capturing lens. A lens 103 normally consists of a plurality of lenses, but is illustrated as a single lens in FIG. 2 for simplification. A communication terminal 6 is a communication terminal for communication with the digital camera 100 by the lens unit 150, and the communication terminal 10 is a communication terminal for communication with the lens unit 150 by the digital camera 100. The lens unit 150 communicates with the system control unit 50 via the communication terminals 6 and 10. A lens system control circuit 4 in the lens unit 150 controls a diaphragm 1 via a diaphragm driving circuit 2. The lens unit 150 changes a zoom ratio by changing the position of the lens 103 via an auto-focus (AF) driving circuit 3 to adjust a focal point to the subject.

An auto-exposure (AE) sensor 17 measures the luminance of a subject through the lens unit 150. A focal point detection unit 11 outputs defocus amount information to the system control unit 50. The system control unit 50 controls the lens unit 150 based on the defocus amount information and performs phase difference AF.

The quick-return mirror 12 (hereinafter, "mirror 12") is moved up/down by an actuator (not illustrated) based on an instruction from the system control unit 50 during exposure, live view image capturing, and moving image capturing. The mirror 12 is a mirror that switches a traveling direction of a light flux that enters from the lens 103 between a viewfinder 16 and an image capturing unit 22. Normally, the mirror 12 is positioned to reflect the light flux so that the light flux is guided to the viewfinder 16. But, in a case where image capturing is performed or a live view is displayed, the mirror 12 is moved upward and retracted from the light flux so that the light flux is guided to the image capturing unit 22 (mirror-up).

The mirror 12 is configured to be a half mirror so that a central portion of the mirror 12 transmits a portion of light. The mirror 12 transmits a portion of the light flux so that the transmitted portion of the light flux enters the focal point detection unit 11 configured to perform focal point detection. A user performing image capturing can check the focal point and composition of an optical subject image acquired through the lens unit 150 by observing the focusing screen 13 through a pentaprism 14 and the viewfinder 16.

A shutter 101 is a mechanical shutter that is controlled by the system control unit 50 to control an exposure time of the image capturing unit 22. The mechanical shutter is, for example, a focal plane shutter.

The image capturing unit 22 is an image sensor such as a charge-coupled device (CCD) sensor or complementary metal oxide semiconductor (CMOS) sensor configured to convert an optical image to an electric signal. An analog/digital (A/D) conversion device 23 converts an analog signal to a digital signal. The A/D conversion device 23 is used to convert an analog signal output from the image capturing unit 22 to a digital signal.

An image processing unit 24 performs predetermined pixel interpolation, resizing processing such as reduction, and color conversion processing on data from the A/D conversion device 23 or data from a memory control unit 15. The image processing unit 24 performs predetermined calculation processing using captured image data, and the system control unit 50 performs exposure control and range finding control based on the obtained calculation result. In this way, AF processing, AE processing, and flash preliminary light emission (EF) processing of a through-the-lens (TTL) method are performed. The image processing unit 24 also performs predetermined calculation processing using captured image data and performs automatic white balance (AWB) processing of the TTL method based on the obtained calculation result.

Output data from the A/D conversion device 23 is written to a memory 32 via the image processing unit 24 and the memory control unit 15 or directly via the memory control unit 15. The memory 32 stores image data that is acquired by the image capturing unit 22 and converted to digital data by the A/D conversion device 23 and image data that is to be displayed on the display unit 28. The memory 32 has a sufficient storage capacity to store a predetermined number of still images, a predetermined length of time of moving images, and audio.

An audio output unit 27 can output an electronic shutter sound and a warning sound. The audio output unit 27 is, for example, a speaker. The audio output unit 27 can be an interface for connecting to an external audio output apparatus, such as a headphone or earphone. For example, the audio output unit 27 is a terminal for wired connection, such as an earphone jack, or an interface for wireless communication such as Bluetooth® communication. In this case, the user hears an electronic shutter sound and a warning sound output to the earphone or headphone via the audio output unit 27. To distinguish between the electronic shutter sound and the opening/closing sound of the shutter 101, the electronic shutter sound indicates sound data recorded in a non-volatile memory 56, which is described below, in the present exemplary embodiment.

The memory 32 is also a memory (video memory) for image display. A digital/analog (D/A) conversion device 19 converts data for image display that is stored in the memory 32 to an analog signal and supplies the analog signal to the display unit 28. In this way, the image data for display that is written to the memory 32 is displayed by the display unit 28 via the D/A conversion device 19. The display unit 28 displays data on a display device, such as a liquid crystal display (LCD), based on the analog signal from the D/A conversion device 19. A digital signal that is A/D converted by the A/D conversion device 23 and accumulated in the memory 32 is converted to an analog signal by the D/A conversion device 19. The analog signal is transferred to the display unit 28 and displayed by the display unit 28, where the display unit 28 functions as an electronic viewfinder and performs through-image display (live view display).

A liquid crystal display portion 41 within a viewfinder displays a frame (AF frame) that indicates a range finding point on which auto-focusing is currently performed and an icon that indicates a camera setting state via a driving circuit 42 for a display portion within a viewfinder. The display portion 43 outside a viewfinder displays various camera setting values, such as a shutter speed and an aperture, via a driving circuit 44 for a display portion outside a viewfinder.

The non-volatile memory 56 is an electrically erasable and recordable memory For example, an electrically erasable and programmable read-only memory (EEPROM) is used. The non-volatile memory 56 stores constant numbers for operations of the system control unit 50 and programs. As used herein, the term "program" refers to a program for executing various flowcharts in the present exemplary embodiment, which is described below. The non-volatile memory 56 stores the electronic shutter sound, which is described below. The electronic shutter sound is recorded in a pulse code modulation (PCM) format or a Moving Picture Experts Group-1 Audio Layer-3 (MP3) format.

The system control unit 50 is at least one processor or circuit that controls the entire digital camera 100. The system control unit 50 executes a program recorded in the non-volatile memory 56 to realize a process according to the present exemplary embodiment, which is described below. A random access memory (RAM) is used as a system memory 52. The constant numbers for operations of the system control unit 50, the variable numbers, and the program read from the non-volatile memory 56 are loaded into the system memory 52. The system control unit 50 performs display control by controlling the memory 32, the D/A conversion device 19, and the display unit 28.

A system timer 53 is a time measurement unit that measures the time for use in various types of control and the time specified by a built-in clock.

The mode selection switch 60, the shutter button 61, the operation unit 70, and the power supply switch 72 are operation units configured to input various operation instructions to the system control unit 50. The mode selection switch 60 changes an operation mode of the system control unit 50 to a still image recording mode, the moving image capturing mode, or the reproduction mode. The still image recording mode includes an automatic image capturing mode, an automatic scene discrimination mode, a manual mode, an aperture priority mode (Av mode), and a shutter speed priority mode (Tv mode). There are also various scene modes in which an image capturing setting is set for each image capturing scene, a program AE mode, and a custom mode. The operation mode is changed to one of the above-described modes with the mode selection switch 60. Alternatively, after a display screen is changed to an image capturing mode list screen with the mode selection switch 60, one of the plurality of displayed modes is selected, and the operation mode is changed to the selected mode using another operation member. Similarly, the moving image capturing mode can include a plurality of modes.

When the shutter button 61 of the digital camera 100 is pressed to a position before an end, i.e., so-called half-pressed (image capturing preparation instruction), a first shutter switch 62 is turned on, and a first shutter switch signal SW1 is generated. An operation for image capturing preparation, such as AF processing, AE processing, AWB processing, and EF processing, is started based on the first shutter switch signal SW1.

When the shutter button 61 is pressed to the end, i.e., so-called fully-pressed (image capturing instruction), a second shutter switch 64 is turned on, and a second shutter switch signal SW2 is generated. The system control unit 50 starts an operation of a series of image capturing processing (main image capturing) from the reading of a signal from the image capturing unit 22 to the writing of an image as an image file to the recording medium 200 based on the second shutter switch signal SW2.

An operation of selecting various functional icons displayed on the display unit 28 is performed so that each operation member of the operation unit 70 is assigned a function as appropriate for each scene, and the operation members act as various functional buttons. Examples of functional buttons include an "END" button, "RETURN" button, "FORWARD IMAGE" button, "JUMP" button, "NARROW-DOWN" button, and "CHANGE ATTRIBUTE" button. For example, if the menu button is pressed, the display unit 28 displays a menu screen on which various settings can be made. The user can intuitively make various settings using the menu screen displayed on the display unit 28 and the four-direction buttons of upward, downward, leftward, and rightward buttons and the "SET" button 75.

The operation unit 70 includes various operation members that each serve as an input unit that receives a user operation.

The operation unit 70 includes at least the following operation units: the shutter button 61, the main electronic dial 71, the power supply switch 72, the sub-electronic dial 73, the directional pad 74, the "SET" button 75, the LV button 76, the enlargement button 77, the reduction button 78, and the reproduction button 79.

A power supply control unit 80 includes a battery detection circuit, a direct current (DC)-DC converter, and a switch circuit configured to switch a block to be energized. The power supply control unit 80 detects whether a battery is attached, a battery type, and a remaining battery level. The power supply control unit 80 controls the DC-DC converter based on the detection result and an instruction from the system control unit 50 and supplies a necessary voltage to each component including the recording medium 200 for a required period of time.

A face detection unit 24a (not illustrated) is at least one processor or circuit configured to detect a specific region, such as the face of a person, from an image acquired by the image processing unit 24. An organ detection unit 24b (not illustrated) is at least one processor or circuit configured to detect an organ region from the image acquired by the image processing unit 24 and the specific region detected by the face detection unit 24a. As used herein, the term "organ" refers to an element of a face, such as an eye, nose, or mouth. In the image capturing apparatus, both the face detection unit 24a and the organ detection unit 24b are part of the image processing unit 24. Specifically, the face detection unit 24a and the organ detection unit 24b can be the same processor or circuit or module that has the functions of both the face detection unit 24a and the organ detection unit 24b or can be different processors or circuits or modules.

A power supply unit 30 includes a primary battery, such as an alkaline battery or a lithium battery, a secondary battery, such as a nickel-cadmium (NiCd) battery, a nickel-metal hydride (NiMH) battery, or a lithium-ion battery, and an alternating-current (AC) adapter. A recording medium interface (I/F) 18 is an interface between the digital camera 100 and the recording medium 200, such as a memory card or a hard disk. The recording medium 200 is a recording medium, such as a memory card, that stores a captured image, and includes a semiconductor memory or a magnetic disk.

A communication unit 54 connects either wirelessly or via a wired cable and transmits and receives video signals and audio signals. The communication unit 54 can connect to a wireless local area network (LAN) and the Internet. The communication unit 54 can transmit an image (including a LV image) captured by the image capturing unit 22 and an image recorded in the recording medium 200 and can receive image data and various types of information from an external device.

An orientation detection unit 55 detects the orientation of the digital camera 100 with respect to the gravity direction. Whether the image captured by the image capturing unit 22 is an image captured with the digital camera 100 held in a landscape orientation or an image captured with the digital camera 100 held in a portrait orientation can be determined based on the orientation detected by the orientation detection unit 55. The system control unit 50 can add orientation information based on the orientation detected by the orientation detection unit 55 to an image file of an image captured by the image capturing unit 22 and can rotate the image and record the rotated image. A sensor such as an acceleration sensor or gyro sensor can be used as the orientation detection unit 55.

A touch panel 70a capable of detecting a touch on the display unit 28 is provided as a component of the operation unit 70. The touch panel 70a and the display unit 28 can be integrally configured. For example, the touch panel 70a is configured such that the light transmittance does not disturb a display on the display unit 28, and the touch panel 70a is mounted on an upper layer of a display surface of the display unit 28. Input coordinates on the touch panel 70a are associated with display coordinates on the display unit 28. In this way, a graphical user interface (GUI) is configured with which the user can operate a screen displayed on the display unit 28 as if the user directly operates the screen. The system control unit 50 can detect below-described operations on the touch panel 70a and below-described states:

- A new touch operation on the touch panel 70a with a finger or a pen that is not touching the touch panel 70a, i.e., a start of a touch (hereinafter, referred to as "touch-down").
- A state where a finger or a pen touches the touch panel 70a (hereinafter, referred to as "touch-on)).
- An operation of moving a finger or a pen while the finger or the pen keeps touching the touch panel 70a (hereinafter, referred to as "touch-move").
- An operation of removing a finger or a pen from the touch panel 70a, i.e., an end of a touch (hereinafter, referred to as "touch-up").
- A state where nothing touches the touch panel 70a (hereinafter, referred to as "touch-off").

If a "touch-down" is detected, a "touch-on" is simultaneously detected. After the "touch-down", unless a "touch-up" is detected, normally the "touch-on" is continuously detected. A state where a "touch-move" is detected is also a state where a "touch-on" is detected. Even if a "touch-on" is detected, unless a touch position is moved, a "touch-move" is not detected. After a "touch-up" of every touching finger or pen is detected, a "touch-off" occurs.

Notifications of the above-described operations/states and the coordinates of a position touched by a finger or a pen on the touch panel 70a are provided to the system control unit 50 via an internal bus. Based on the notification information, the system control unit 50 determines an operation (touch operation) performed on the touch panel 70a. As to a "touch-move", the direction of movement of a finger or a pen moved on the touch panel 70a can also be determined for each of vertical and horizontal components on the touch panel 70a based on a change in position coordinates. In a case where a "touch-move" of a predetermined distance or longer is detected, it is determined that a slide operation (drag) is performed.

An operation of quickly moving a finger or a pen for a predetermined distance on a touch panel with the finger or pen touching the touch panel and then removing the finger or pen from the touch panel is referred to as "flick". In other words, a "flick" is an operation of quickly moving a finger or a pen across the touch panel 70a in such a manner that the finger or pen contacts the touch panel 70a. If a "touch-move" of a predetermined distance or longer at a predetermined speed or higher is detected and then a "touch-up" is detected, it is determined that a "flick" is performed (it is determined that a "flick" is performed following a slide operation).

A touch operation of simultaneously touching a plurality of points (e.g., two points) and then moving the touch positions closer to each other is referred to as "pinch-in". A touch operation of simultaneously touching a plurality of points and then moving the touch positions farther from each other is referred to as "pinch-out". The "pinch-out" and the "pinch-in" are collectively referred to as "pinch operation" (or simply as "pinch").

The touch panel 70a can be implemented by any method of implementing a touch panel, such as a resistive film method, a capacitive method, a surface acoustic wave method, an infrared method, an electromagnetic induction method, an image recognition method, and an optical sensor method. In some methods, a touch is detected when there is contact with a touch panel. In some other methods, a touch is detected when a finger or a pen is brought near a touch panel. Any method can be implemented.

The image capturing mode of the digital camera 100 is described below. The digital camera 100 has two image capturing modes: an electronic shutter mode and a mechanical shutter mode.

In the mechanical shutter mode, the system control unit 50 exposes the image sensor by performing control to open/close a light-shielding curtain including front and rear curtains included in the shutter 101, and captures an image. The image capturing in the mechanical shutter mode is advantageous in that so-called rolling distortions are less likely to occur and captured images contain less noise.

In the electronic shutter mode, the system control unit 50 captures an image without driving the shutter 101. When the digital camera 100 captures an image in the electronic shutter mode, the shutter 101 is in an open state. The system control unit 50 controls the exposure time of the image sensor of the image capturing unit 22 based on the system timer 53. The image capturing in the electronic shutter mode is advantageous in that a shutter speed faster than that in the mechanical shutter mode can be set and vibrations are less likely to occur during image capturing.

In the image capturing in the electronic shutter mode, the shutter 101 is not opened/closed, so that no electronic shutter sound is generated. Thus, the system control unit 50 outputs an electronic shutter sound stored in the non-volatile memory 56 via the audio output unit 27. In the present exemplary embodiment, the electronic shutter sound is an artificial electronic sound made by imitating the opening/closing sounds of the light-shielding curtain of the shutter 101. The electronic shutter sound can be significantly different in tone or length from real opening/closing sounds of the shutter 101 as long as the user can, based on the electronic shutter sound, recognize that an image is captured.

The user can set the audio output unit 27 outputting no electronic shutter sounds to set the digital camera 100 to a mode (so-called silent mode) in which sounds are not generated during image capturing. The silent mode is suitable for image capturing in a place where silence is required, such as a sports competition venue or an art museum. The user can turn on and off the silent mode by operating the digital camera 100 via the operation unit 70.

The digital camera 100 includes an auto-shutter mode in which image capturing is performed while the electronic shutter mode and the mechanical shutter mode are automatically switched. In the auto-shutter mode, the system control unit 50 refers to the state of a subject and the image capturing settings and determines which of the image capturing modes is to be used in image capturing. The state of a subject is data about the subject that is measured by the lens unit 150, the luminance of the subject that is measured by the AE sensor 17, and a result of calculation by the image processing unit 24. The image capturing settings are, for example, data about image capturing that is measured by the lens unit 150, the type of the still image recording mode, the type of the moving image capturing mode, and the zoom ratio. For example, the system control unit 50 determines which one of the capturing modes is to be used based on the shutter speed set to the digital camera 100. In the image capturing in the automatic image capturing mode, if, for example, the luminance of the subject that is measured by the AE sensor 17 changes significantly, the system control unit 50 changes the shutter speed based on the luminance.

As described, in a case where the state of the subject is changed, the system control unit 50 changes the shutter speed thus, there is a possibility that the system control unit 50 switches the image capturing mode in a short period of time. For example, in a case where the zoom ratio is high, a captured image can be blurred by even a small vibration, and the system control unit 50 performs image capturing in the electronic shutter mode in which vibrations are less likely to occur. In a case where the zoom ratio is low, insignificant vibrations are not likely to affect captured images, so the system control unit 50 performs image capturing in the mechanical shutter mode in which captured images are less likely to contain noise.

As described above, the system control unit 50 can automatically switch the image capturing mode to be used in image capturing based on the state of the subject and the settings of the digital camera 100. In the image capturing in the electronic shutter mode in the auto-shutter mode, the digital camera 100 outputs a sound that is the same as the electronic shutter sound in the electronic shutter mode.

Next, a method of setting the image capturing mode and a method of setting whether to output the electronic shutter sound during image capturing is described.

FIGS. 3A to 3C each illustrate an example of a menu screen for setting whether to output the electronic shutter sound and for setting the image capturing mode. If, for example, a user operation of changing to the menu screen is received, the digital camera 100 displays the menu screen on the display unit 28. The user can change each setting by operating the operation unit 70 of the digital camera 100. In the present exemplary embodiment, the menu screen is displayed as illustrated in FIG. 3A.

An item 300 is an item for setting the image capturing mode. An item 310 is an item for setting whether to output the electronic shutter sound. If the user selects the item 300, the digital camera 100 displays a menu for selecting the mechanical shutter mode, the electronic shutter mode, or the auto-shutter mode as illustrated in FIG. 3B. In a case where the user selects an option 301, the digital camera 100 is set to perform image capturing in the mechanical shutter mode. In a case where the user selects an option 302, the digital camera 100 is set to perform image capturing in the electronic shutter mode. In a case where the user selects an option 303, the digital camera 100 is set to perform image capturing in the auto-shutter mode. At this time, the digital camera 100 does not display other items so that the user can select an option with ease.

In a case where the user selects the item 310, the digital camera 100 displays a menu for selecting whether to output the electronic shutter sound (ON or OFF) as illustrated in FIG. 3C. In a case where the user selects an option 311, the digital camera 100 outputs the electronic shutter sound during image capturing. In a case where the user selects an option 312, the digital camera 100 does not output the electronic shutter sound during image capturing. At this time, the digital camera 100 does not display other items so that the user can easily select an option.

A method of setting the electronic shutter sound to turn on or off the electronic shutter sound in conjunction with the user-selected image capturing mode will be described below with reference to FIGS. 4A to 4C.

Figure 4A:
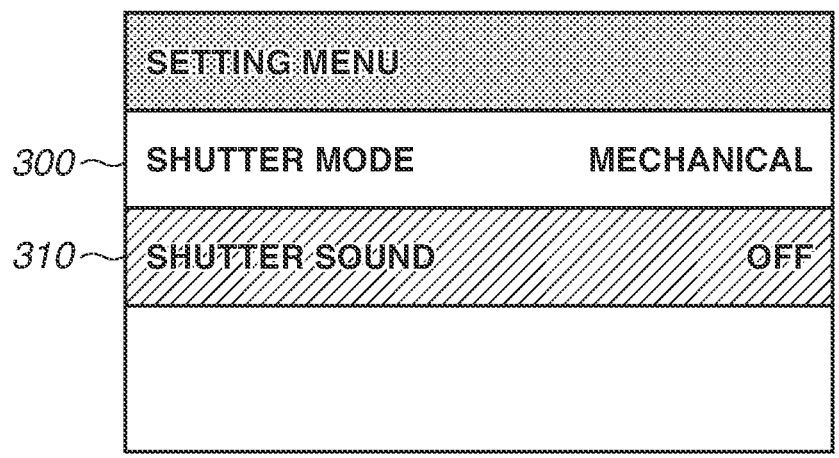
FIG. 4A illustrates a screen of the digital camera in a case where the user changes a setting to a mechanical shutter mode.

FIG. 4A illustrates an example of a screen of the digital camera 100 in a case where the user changes the setting of the item 300 to the mechanical shutter mode. In this case, the digital camera 100 automatically sets the setting whether to output the electronic shutter sound to turn off the output of the electronic shutter sound. The digital camera 100 fixes the setting to not output the electronic shutter sound. For example, the digital camera 100 shades the area where whether to output the electronic shutter sound can be selected, thereby notifying the user that the setting cannot be changed. The reason is that since the user can hear the opening/closing sounds of the shutter 101 during image capturing in the mechanical shutter mode by the digital camera 100, it is unnecessary to further output the electronic shutter sound. The digital camera 100 changes the display of the display unit 28 to indicate that the electronic shutter sound is not to be output. For example, the digital camera 100 changes the display of the options of the item 310 to "OFF".

Figure 4B:
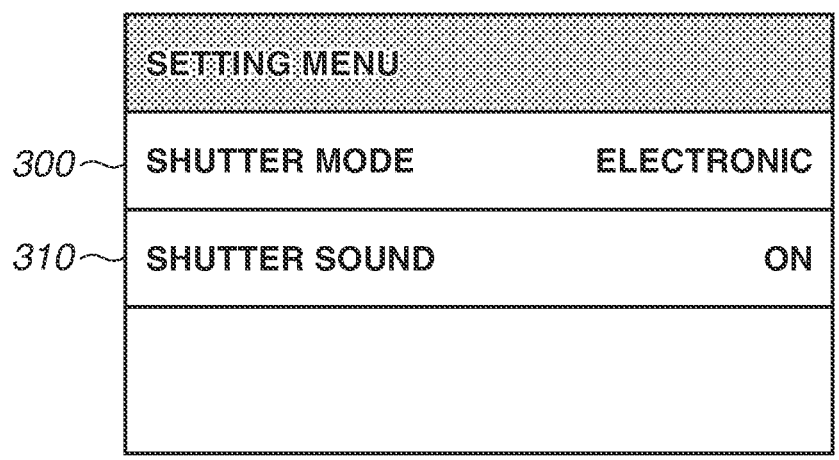
FIG. 4B illustrates a screen of the digital camera in a case where the user changes the setting to an electronic shutter mode.

FIG. 4B illustrates an example of a screen of the digital camera 100 in a case where the user changes the setting to the electronic shutter mode. In an initial setting, the item 310 is set to "ON". The user can freely change the setting whether to output the electronic shutter sound by, for example, operating the operation unit 70. In a case where the electronic shutter mode is changed to another image capturing mode by a user operation, the digital camera 100 stores the electronic shutter sound setting for the electronic shutter mode. Then, if the digital camera 100 is set to the electronic shutter mode again, the digital camera 100 restores the recorded setting. The above-described processing is performed so that even in a case where the user uses the digital camera 100 while switching the image capturing mode, the user can use the digital camera 100 using the previous setting without operating the electronic shutter sound setting.

Figure 4C:
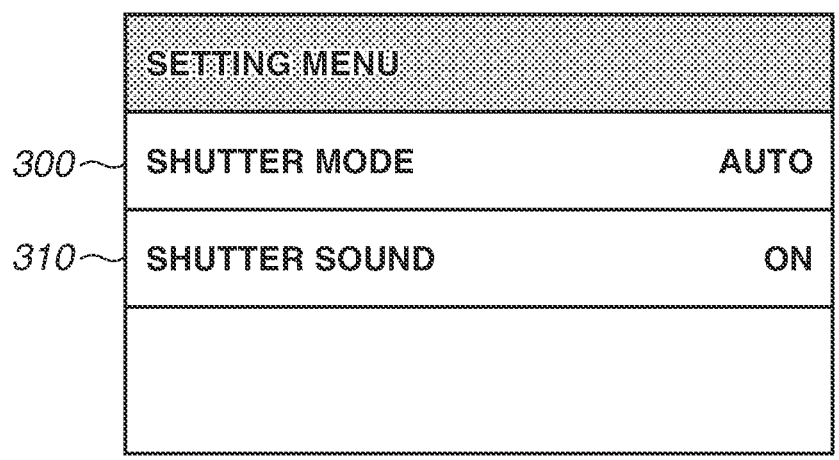
FIG. 4C illustrates a screen of the digital camera in a case where the user changes the setting to an auto-shutter mode.

FIG. 4C illustrates an example of a screen of the digital camera 100 in a case where the user changes the setting to the auto-shutter mode. In this case, the digital camera 100 automatically sets the setting whether to output the electronic shutter sound in the mechanical shutter mode to turn off the electronic shutter sound. The digital camera 100 automatically sets the setting whether to output the electronic shutter sound in the electronic shutter mode to turn on the output of the electronic shutter sound because in the auto-shutter mode, the mechanical shutter mode in which the opening/closing sounds of the shutter 101 are generated and the electronic shutter mode in which the opening/closing sounds of the shutter 101 are not generated are automatically switched. If the mechanical shutter mode is switched to the electronic shutter mode, especially during continuous image capturing, the electronic shutter sound is suddenly lost and the user can feel strange. Thus, in a case where the setting is changed to the auto-shutter mode, the digital camera 100 changes the setting such that the electronic shutter sound is output in the electronic shutter mode.

Alternatively, the setting whether to output the electronic shutter sound in the electronic shutter mode can be configured to be changeable by the user. In a case where the electronic shutter sound is not output during image capturing in the electronic shutter mode, the user can distinguish between the image capturing in the electronic shutter mode and the image capturing in the mechanical shutter mode.

FIG. 5 is a flowchart illustrating an example of a method of setting whether to output the electronic shutter sound of the digital camera 100 in the present exemplary embodiment. Software stored in the non-volatile memory 56 is loaded into the system memory 52, and the system control unit 50 executes the loaded software to realize the process illustrated in FIG. 5. A start of the process is triggered by displaying a screen for changing the setting of the image capturing mode as illustrated in FIG. 3A on the display unit 28.

In step S501, the system control unit 50 determines whether the image capturing mode is selected by a user operation. For example, the system control unit 50 determines whether the item 300 is touched via the touch panel 70a on the screen illustrated in FIG. 3A. In a case where the system control unit 50 determines that the image capturing mode is selected (YES in step S501), the processing proceeds to step S502. In a case where the system control unit 50 determines that the image capturing mode is not selected (NO in step S501), the processing proceeds to step S508, and the system control unit 50 waits for a user operation.

In step S502, the system control unit 50 determines whether the previous image capturing mode before the change by the user operation in step S501 is the electronic shutter mode. In a case where the previous image capturing mode is the electronic shutter mode (YES in step S502), the processing proceeds to step S503. In a case where the previous image capturing mode is not the electronic shutter mode (NO in step S502), the processing proceeds to step S504. In step S503, the system control unit 50 stores the electronic shutter sound setting for the electronic shutter mode, which is the previous image capturing mode before the change in step S501, in the non-volatile memory 56.

In step S504, the system control unit 50 determines the image capturing mode selected by the user. For example, the system control unit 50 determines which of the options 301 to 303 is touched via the touch panel 70a on the screen illustrated in FIG. 3B. In a case where the system control unit 50 determines that the electronic shutter mode is selected ("ELECTRONIC SHUTTER MODE" in step S504), the processing proceeds to step S505. In a case where the system control unit 50 determines that the mechanical shutter mode is selected ("MECHANICAL SHUTTER MODE" in step S504), the processing proceeds to step S506. In a case where the system control unit 50 determines that the auto-shutter mode is selected ("AUTO-SHUTTER MODE" in step S504), the processing proceeds to step S507.

In step S505, the system control unit 50 changes the setting to the electronic shutter sound setting for the electronic shutter mode that is stored in the non-volatile memory 56 as illustrated in FIG. 4B. In a case where the electronic shutter sound setting for the electronic shutter mode is not stored in the non-volatile memory 56, the system control unit 50 applies an initial setting value to the electronic shutter sound setting. In step S506, the system control unit 50 sets the setting whether to output the electronic shutter sound to turn off the output of the electronic shutter sound as illustrated in FIG. 4A.

In step S507, the system control unit 50 automatically sets the setting whether to output the electronic shutter sound in the electronic shutter mode to turn on the output of the electronic shutter sound as illustrated in FIG. 4C. The system control unit 50 sets the setting whether to output the electronic shutter sound in the mechanical shutter mode to turn off the output of the electronic shutter sound.

In step S508, the system control unit 50 determines whether an operation for ending the process of changing the setting of the image capturing mode is received. For example, in a case where the system control unit 50 detects the press of the "SET" button 75, the system control unit 50 ends the process of changing the setting of the image capturing mode. In a case where an operation for changing the setting of the image capturing mode is received (YES in step S508), the process ends. In a case where an operation for changing the setting of the image capturing mode is not received (NO in step S508), the processing returns to step S501, and the process continues.

An example of the method of setting whether to output the electronic shutter sound of the digital camera 100 has been described above. With the above-described technique, the user hears a sound based on the click of the shutter in each of the auto-shutter mode, the mechanical shutter mode, and the electronic shutter mode, so that the user can use the digital camera 100 with a natural operational feeling.

In the case where the digital camera 100 is set to the electronic shutter mode, the digital camera 100 can set the setting whether to output the electronic shutter sound to the initial setting value every time. For example, in a case where the initial setting is "ON", the user can hear the electronic shutter sound even in the electronic shutter mode without making the electronic shutter sound setting, so that the user can use the digital camera 100 with usability similar to that in the other image capturing modes. The initial setting value can be configured to be changeable. For example, in a case where the initial setting is "OFF", the user can quietly capture an image in the electronic shutter mode without making the electronic shutter sound setting, so that it becomes easy to switch the image capturing mode as appropriate to a situation of the subject.

Figure 6:
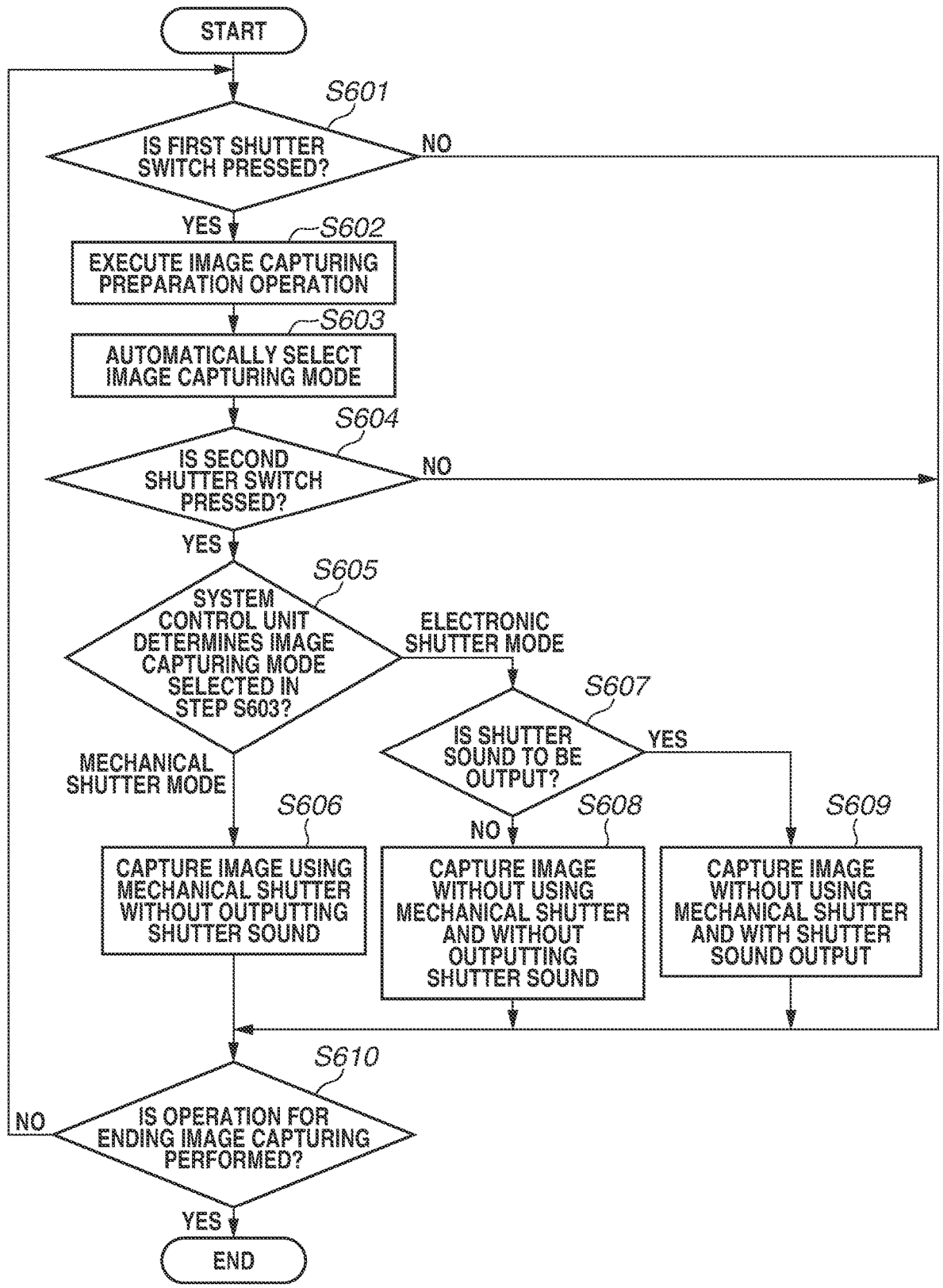
FIG. 6 is a flowchart illustrating an example of a process of image capturing in the auto-shutter mode of the digital camera according to the first exemplary embodiment.

FIG. 6 is a flowchart illustrating an example of a process of image capturing in the auto-shutter mode of the digital camera 100 in the present exemplary embodiment. Software stored in the non-volatile memory 56 is loaded into the system memory 52, and the system control unit 50 executes the loaded software to realize the process. A start of the process is triggered by a start of image capturing based on a received operation on the operation unit 70.

In step S601, the system control unit 50 determines whether the first shutter switch 62 is pressed. For example, the system control unit 50 determines whether the first shutter switch signal SW1 is generated. In a case where the first shutter switch 62 is pressed (YES in step S601), the processing proceeds to step S602. In a case where the first shutter switch 62 is not pressed (NO in step S601), the processing proceeds to step S610.

In step S602, the system control unit 50 executes an operation for image capturing preparation, such as AF processing, AE processing, and AWB processing. In step S603, the system control unit 50 automatically selects the image capturing mode. For example, in a case where the shutter speed is fast, the system control unit 50 selects the electronic shutter mode. For example, in a case where the zoom ratio is high, the system control unit 50 selects the mechanical shutter mode.

In step S604, whether the second shutter switch 64 is pressed is determined. For example, the system control unit 50 determines whether the second shutter switch signal SW2 is generated. In a case where the system control unit 50 determines that the second shutter switch signal SW2 is generated (YES in step S604), the processing proceeds to step S605. In a case where the second shutter switch signal SW2 is not generated (NO in step S604), the processing proceeds to step S610.

In step S605, the system control unit 50 determines the image capturing mode selected in step S603. In a case where the mechanical shutter mode is selected ("MECHANICAL SHUTTER MODE" in step S605), the processing proceeds to step S606. In a case where the electronic shutter mode is selected ("ELECTRONIC SHUTTER MODE" in step S605), the processing proceeds to step S607.

In step S606, the system control unit 50 executes a main image capturing operation in the mechanical shutter mode. In step S606, the system control unit 50 executes the main image capturing operation using the mechanical shutter. In step S606, the system control unit 50 does not output the electronic shutter sound from the audio output unit 27.

In steps S607 to S609, the system control unit 50 executes the main image capturing operation in the electronic shutter mode. In step S607, the system control unit 50 determines whether the setting to output the electronic shutter sound in the main image capturing operation is made. In a case where the setting whether to output the electronic shutter sound is not changed by the user after the user sets the image capturing mode to the auto-shutter mode, the setting to output the electronic shutter sound in the main image capturing operation is made. In a case where the setting to not output the electronic shutter sound is made (NO in step S607), the processing proceeds to step S608. In a case where the setting to output the electronic shutter sound is made (YES in step S607), the processing proceeds to step S609.

In step S608, the system control unit 50 executes a main image capturing operation using the electronic shutter. In step S608, the system control unit 50 does not output the electronic shutter sound from the audio output unit 27.

In step S609, the system control unit 50 executes a main image capturing operation using the electronic shutter. In step S609, the system control unit 50 outputs the electronic shutter sound from the audio output unit 27.

In step S610, the system control unit 50 determines whether an operation for ending the image capturing is performed by the user. In a case where an operation for ending the image capturing is not performed (NO in step S610), the processing returns to step S601, and the process illustrated in the flowchart continues. In a case where an operation for ending the image capturing is performed (YES in step S610), the process illustrated in the flowchart ends.

The example of the process of image capturing in the auto-shutter mode of the digital camera 100 is described above. With the above-described technique, the user can recognize, based on the sound, that an image is captured even in the case where the digital camera 100 automatically switches the mechanical shutter mode and the electronic shutter mode and performs image capturing.

In the present exemplary embodiment, the electronic shutter sound in the electronic shutter mode and the electronic shutter sound in the auto-shutter mode are the same sound. In a case where the user wishes to distinguish between image capturing in the electronic shutter mode and image capturing in the mechanical shutter mode during image capturing in the auto-shutter mode, the electronic shutter sound is desirably different from the opening/closing sounds of the shutter 101.

In another exemplary embodiment, the user can feel that the electronic shutter sound during image capturing in the electronic shutter mode is similar to the opening/closing sounds of the shutter 101. Thus, the type of the electronic shutter sound can be configured to be selectable for each mode by the user as illustrated in FIGS. 7A to 7C.

Figure 7A:
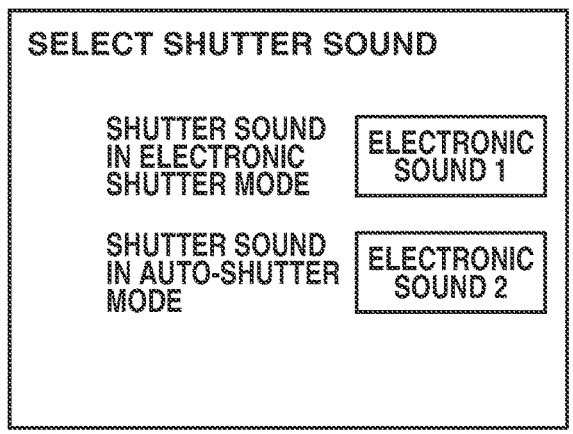
FIG. 7A illustrates an example of a screen for changing an electronic shutter sound in the electronic shutter mode and an electronic shutter sound in the auto-shutter mode.

FIG. 7A illustrates an example of a screen for changing the electronic shutter sound in the electronic shutter mode and the electronic shutter sound in the auto-shutter mode. The user can check the type of the current electronic shutter sound in the electronic shutter mode and the type of the current electronic shutter sound in the auto-shutter mode by referring to the screen. For example, the user can change the screen to a screen for changing the electronic shutter sound in each mode by operating the operation unit 70.

Figure 7C:
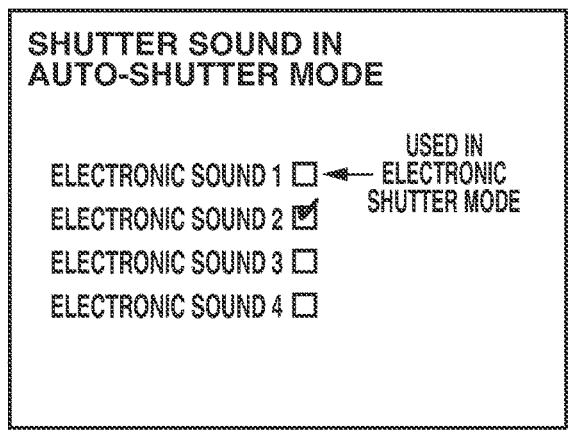
FIG. 7C illustrates an example of a screen for changing the electronic shutter sound in the auto-shutter mode.
Figure 7B:
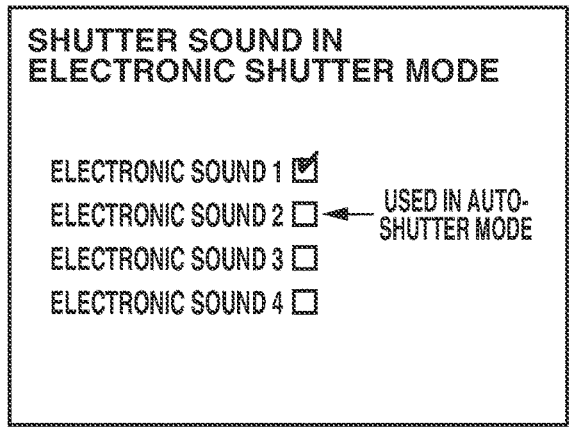
FIG. 7B illustrates an example of a screen for changing the electronic shutter sound in the electronic shutter mode.

FIG. 7B illustrates an example of a screen for changing the electronic shutter sound in the electronic shutter mode. In the present exemplary embodiment, the digital camera 100 has electronic sounds 1, 2, 3, and 4. For example, the user selects the electronic sound 1 and changes the electronic shutter sound in the electronic shutter mode by operating the operation unit 70. At this time, the digital camera 100 displays information that indicates which electronic sound is set as the electronic shutter sound in the auto-shutter mode, making it easier for the user to select a desired electronic sound.

FIG. 7C illustrates an example of a screen for changing the electronic shutter sound in the auto-shutter mode. For example, the user selects the electronic sound 2 and changes the electronic shutter sound in the auto-shutter mode by operating the operation unit 70. At this time, the digital camera 100 displays information that indicates which electronic sound is set as the electronic shutter sound in the electronic shutter mode, making it easier for the user to select a desired electronic sound.

As described above, the electronic shutter sound in the electronic shutter mode and the electronic shutter sound in the auto-shutter mode are selectable so that the user can use a different electronic shutter sound for each image capturing mode.

For example, the electronic sound 1 is a sound made by imitating the opening/closing sounds of the shutter 101, and the electronic sound 2 is a beep sound that is clearly different from the opening/closing sounds of the shutter 101. In this case, the user can use the digital camera 100 in the electronic shutter mode with usability similar to that in the mechanical shutter mode. In the auto-shutter mode, the user can distinguish between image capturing in the mechanical shutter mode and image capturing in the electronic shutter mode based on the electronic shutter sound. This enables the user to recognize whether an image is captured in an intended image capturing mode even during the auto-shutter mode. In a case where an image is captured in an unintended image capturing mode, the user can change the setting of the digital camera 100 to capture an image in the intended image capturing mode.

Figure 7D:
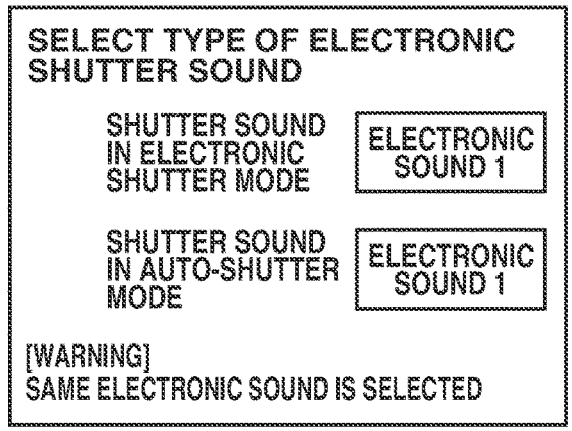
FIG. 7D illustrates an example of a method of providing a notification of a warning of the digital camera in a case where the electronic shutter sound in the electronic shutter mode and the electronic shutter sound in the auto-shutter mode are the same electronic sound.

In a case where the electronic shutter sound in the electronic shutter mode and the electronic shutter sound in the auto-shutter mode are set to the same electronic sound, the digital camera 100 displays a warning on the display unit 28 to notify the user that the electronic shutter sounds are set to the same electronic sound as illustrated, for example, in FIG. 7D.

While the configuration of the digital camera 100 that has the four types of electronic sounds is described in the present exemplary embodiment, in order to implement the configuration, the digital camera 100 can include a plurality of types of electronic sounds.

Other Exemplary Embodiments

One or more functions of the above-described exemplary embodiment can be realized by supplying a program to a system or apparatus via a network or storage medium. One or more processors of a computer of the system or apparatus reads the program and executes the read program. The one or more functions can also be realized by a circuit (e.g., application-specific integrated circuit (ASIC)).

The above-described exemplary embodiments are not seen to be limiting, and can be implemented by modifying features within the spirit of the disclosure. Various additional embodiments can be implemented by an appropriate combination of the plurality of features disclosed in the above-described exemplary embodiments. For example, one or some of the features described in the exemplary embodiments can be eliminated or features across different exemplary embodiments can be combined as appropriate.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-234104, filed Dec. 14, 2018, which is hereby incorporated by reference herein in its entirety.

What is claimed is:

1. An image capturing apparatus comprising:
an image capturing unit including a mechanical shutter;
an output unit configured to output an electronic sound;
a control unit configured to implement:
a first image capturing mode in which the image capturing unit is controlled to execute image capturing using the mechanical shutter;
a second image capturing mode in which the image capturing unit is controlled to execute image capturing without the mechanical shutter; and
a third image capturing mode in which the image capturing unit is controlled to automatically switch between image capturing using the mechanical shutter and image capturing without the mechanical shutter and then execute image capturing; and a setting unit configured to set whether to output the electronic sound from the output unit, wherein during the image capturing in the second image capturing mode, the control unit controls the output unit based on the setting made by the setting unit, and wherein during the image capturing without the mechanical shutter in the third image capturing mode, the control unit controls the output unit such that the electronic sound is output regardless of the setting made by the setting unit.

2. The image capturing apparatus according to claim 1, wherein during the image capturing using the mechanical shutter in the first image capturing mode, the control unit controls the output unit such that the electronic sound is not output regardless of the setting made by the setting unit.

3. The image capturing apparatus according to claim 1,
wherein in a case where the setting unit sets to output the electronic sound, the control unit controls the output unit such that the electronic sound is output during the image capturing without the mechanical shutter in the second image capturing mode, and wherein in a case where the setting unit sets not to output the electronic sound, the control unit controls the output unit such that the electronic sound is not output during the image capturing without the mechanical shutter in the second image capturing mode.

4. The image capturing apparatus according to claim 1, further comprising a storing unit,
wherein during the image capturing without the mechanical shutter in the second image capturing mode, the control unit stores the setting whether to output the electronic sound from the output unit as a first setting in the storing unit, and wherein in a case where there is a change from the first image capturing mode or the third image capturing mode to the second image capturing mode, the control unit changes the setting whether to output the electronic sound from the output unit during the image capturing without the mechanical shutter in the second image capturing mode to the first setting.

5. The image capturing apparatus according to claim 1, wherein in a case where the image capturing unit performs image capturing in the third image capturing mode, the control unit automatically switches between image capturing using the mechanical shutter and image capturing without the mechanical shutter based on one or more of a state of a subject or an image capturing setting and then executes image capturing.

6. The image capturing apparatus according to claim 5, wherein the state of the subject is one or more of a luminance of the subject or data about the subject that is measured by the image capturing unit.

7. The image capturing apparatus according to claim 5, wherein the image capturing setting is one or more of a zoom ratio, data about the image capturing that is measured by the image capturing unit, or a type of a mode for the image capturing by the image capturing unit.

8. The image capturing apparatus according to claim 1, wherein the electronic sound is an artificial sound similar to an opening/closing sound of a light-shielding curtain of the mechanical shutter.

9. The image capturing apparatus according to claim 1, wherein the electronic sound that is output during the image capturing in the second image capturing mode and the electronic sound that is output during the image capturing in the third image capturing mode are different sounds.

10. The image capturing apparatus according to claim 1, wherein in a case where the electronic sound that is output during the image capturing in the second image capturing mode and the electronic sound that is output during the image capturing in the third image capturing mode are the same sound, the control unit provides a warning notification.

11. The image capturing apparatus according to claim 1, further comprising an operation unit configured to receive a user operation,
wherein the setting unit sets whether to output the electronic sound from the output unit based on the user operation via the operation unit.

12. A method of controlling an image capturing apparatus including an image capturing unit including a mechanical shutter and an output unit configured to output an electronic sound by reproducing sound data, the method comprising:
executing a first image capturing mode in which the image capturing unit executes image capturing using the mechanical shutter;
executing a second image capturing mode in which the image capturing unit executes image capturing without the mechanical shutter; executing a third image capturing mode in which the image capturing unit automatically switches between image capturing using the mechanical shutter and image capturing without the mechanical shutter and then executes image capturing;
setting whether to output the electronic sound from the output unit;
controlling the output unit based on the setting during the image capturing in the second image capturing mode; and
controlling the output unit such that the electronic sound is output regardless of the setting during the image capturing without the mechanical shutter in the third image capturing mode.

13. An image capturing apparatus comprising:
an image capturing unit including a mechanical shutter;
an output unit configured to output an electronic sound;
an operation unit configured to receive a user operation;
a control unit configured to implement:
a first image capturing mode in which the image capturing unit is controlled to execute image capturing using the mechanical shutter;
a second image capturing mode in which the image capturing unit is controlled to execute image capturing without the mechanical shutter; and
a third image capturing mode in which the image capturing unit is controlled to automatically switch between image capturing using the mechanical shutter and image capturing without the mechanical shutter and then execute image capturing; and
a setting unit configured to set whether to output the electronic sound from the output unit based on the user operation via the operation unit,
wherein during the image capturing without the mechanical shutter in the third image capturing mode, the control unit controls the output unit such that the electronic sound is output regardless of the setting made by the setting unit.

14. A non-transitory computer-readable recording medium storing a program that causes a computer to execute a method of controlling an image capturing apparatus that includes an image capturing unit including a mechanical shutter and an output unit configured to output an electronic sound by reproducing sound data, the method comprising:

executing a first image capturing mode in which the image capturing unit executes image capturing using the mechanical shutter;

executing a second image capturing mode in which the image capturing unit executes image capturing without the mechanical shutter;

executing a third image capturing mode in which the image capturing unit automatically switches between image capturing using the mechanical shutter and the image capturing without the mechanical shutter and then executes image capturing;

setting whether to output the electronic sound from the output unit;

controlling the output unit based on the setting during the image capturing in the second image capturing mode; and controlling the output unit such that the electronic sound is output regardless of the setting during the image capturing without the mechanical shutter in the third image capturing mode.

\* \* \* \* \*